(No Model.)
F. G. TALLERDAY.
TANK.
No. 567,667. Patented Sept. 15, 1896.
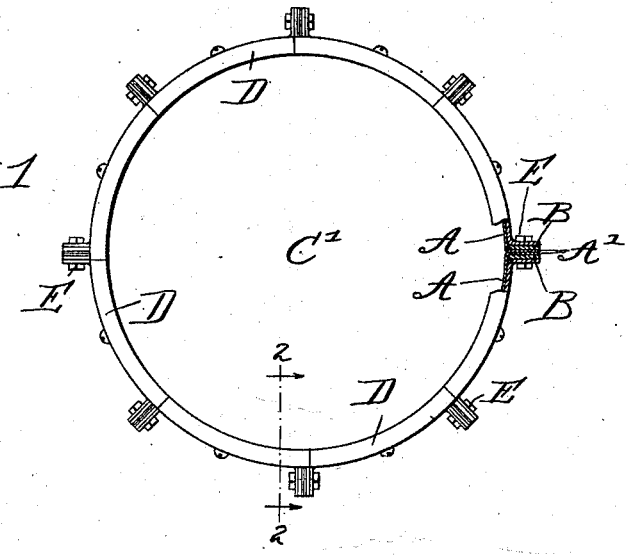
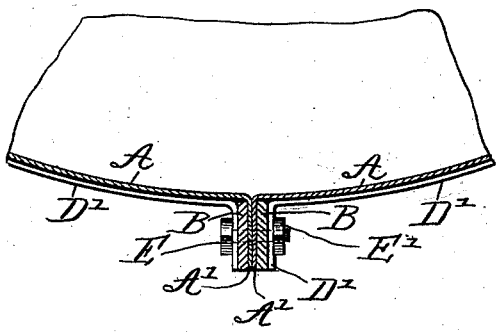
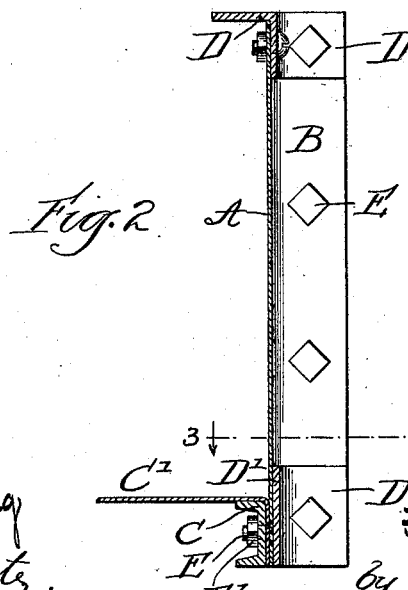
Witnesses
Wm. F. Hanning
Ray White.
Inventor
Franklin G. Tallerday,
by L. L. Morrison,
Atty.

UNITED STATES PATENT OFFICE.

FRANKLIN G. TALLERDAY, OF MISHAWAKA, INDIANA, ASSIGNOR OF TWO-THIRDS TO JOHN W. ZIGLER AND W. ERNEST BORLEY, OF SAME PLACE.

TANK.

SPECIFICATION forming part of Letters Patent No. 567,667, dated September 15, 1896.

Application filed July 29, 1895. Serial No. 557,502. (No model.)

*To all whom it may concern:*

Be it known that I, FRANKLIN G. TALLERDAY, a citizen of the United States, residing at Mishawaka, in the county of St. Joseph and State of Indiana, have invented certain new and useful Improvements in Tanks, of which the following is a specification.

The object of my invention is the production of metal tanks of cheap and simple construction that can be shipped knocked down and afterward be readily put together by unskilled persons; and it consists of certain new and useful features of construction and combinations of parts hereinafter fully described, and specifically pointed out in the claim.

Referring to the accompanying drawings, which form a part of this specification, Figure 1 is a top plan view of a tank embodying my improvements. Fig. 2 is a vertical section, at the dotted line 2 in Fig. 1, of parts there shown. Fig. 3 is a transverse section, at the dotted line 3, of parts there shown.

Like letters of reference indicate corresponding parts throughout the several views.

A are segments forming the tank-body, having their edges turned transversely backward to form connecting flanges A', whereby to secure the former together.

B are stays for holding the segments A together, and also for stiffening the tank as a whole.

C is a ring of channeled steel having a circular piece C' flanged down over it to form the bottom of the tank.

D D' are hoops for holding together and strengthening the top and bottom of the tank.

E E' are bolts and nuts for connecting and securing together the component parts of the structure.

The parts of the tank are shipped in knockdown and may be put together by persons unskilled in mechanics.

I claim—

As a new article of manufacture, a tank composed of a series of segments, backwardly-extending flanges A' formed integral therewith projecting from the edges of the segments and having coincident openings therein, openings near the bottom ends of said segments, a bottom for said tank, a downwardly-extending flange integral therewith a hoop within the flange, coincident openings through the flange and hoop corresponding with the openings in the lower ends of the segments, the stays B and the hoops D and D' substantially as and for the purpose specified.

FRANKLIN G. TALLERDAY.

Witnesses:
  L. L. MORRISON,
  NELLIE BUNKER.